(12) United States Patent
Levin et al.

(10) Patent No.: US 8,068,534 B2
(45) Date of Patent: Nov. 29, 2011

(54) AUTHENTICATING A SIGNAL BASED ON AN UNKNOWN COMPONENT THEREOF

(75) Inventors: Peter Levin, Newtonville, MA (US); David S. De Lorenzo, Palo Alto, CA (US); Per K. Enge, Mountain View, CA (US); Sherman C. Lo, San Mateo, CA (US)

(73) Assignee: Zanio, Inc.

( * ) Notice: Subject to any disclaimer, the term of this patent is extended or adjusted under 35 U.S.C. 154(b) by 830 days.

(21) Appl. No.: 12/012,416

(22) Filed: Feb. 2, 2008

(65) Prior Publication Data
US 2010/0284442 A1 Nov. 11, 2010

(51) Int. Cl.
*H04B 1/00* (2006.01)
(52) U.S. Cl. .................... 375/147; 375/130
(58) Field of Classification Search .......... 375/147, 375/130, 316, 349, 347, 348, 343, 267; 342/357.09, 342/357.15, 357.08
See application file for complete search history.

(56) References Cited

U.S. PATENT DOCUMENTS

| | | | |
|---|---|---|---|
| 5,557,284 A | 9/1996 | Hartman | |
| 5,754,657 A | 5/1998 | Schipper | |
| 5,757,916 A | 5/1998 | MacDoran et al. | |
| 5,790,074 A | 8/1998 | Rangedahl et al. | |
| 5,825,887 A * | 10/1998 | Lennen ...................... | 380/34 |
| 5,955,987 A | 9/1999 | Murphy et al. | |
| 6,104,815 A | 8/2000 | Alcon et al. | |
| 6,216,007 B1 | 4/2001 | Havinis et al. | |
| 6,934,631 B2 * | 8/2005 | Dentinger et al. ............ | 701/213 |
| 7,609,201 B2 | 10/2009 | Masuda | |
| 2002/0017977 A1 | 2/2002 | Wall | |
| 2004/0203868 A1 | 10/2004 | Eidson | |
| 2007/0200756 A1 | 8/2007 | Saito | |

* cited by examiner

*Primary Examiner* — Khai Tran
(74) *Attorney, Agent, or Firm* — Henry T. Brendzel

(57) ABSTRACT

Authentication of a signal, $signal_A$, that is provided as having been received from a source at a first global location by comparing it to a signal that is received from the source at a second global location, $signal_B$, where $signal_B$ contains an unknown signal that is unique to the source, and determining that $signal_A$ contains the same unknown signal that is contained in $signal_B$.

9 Claims, 4 Drawing Sheets

AUTHENTICATING A SIGNAL BASED ON AN UNKNOWN COMPONENT THEREOF

BACKGROUND OF THE INVENTION

This invention relates to global positioning, and more particularly to the issue of confidence that a user has in global positioning information that equipment may provide. In the context of this disclosure, global positioning encompasses the absolute geo-location as well are the relative location of one object relative to another object.

There are numerous electronic ways by which global positioning may be provided. Some are terrestrial, and some are based on satellites. A satellite system that currently is most commonly used is the Global Positioning System (GPS), and it is quite well known in the sense that many people have GPS receivers that assist them in determining their physical location. GPS uses a collection of satellites that are arranged to orbit the Earth so that at least four satellites are always within the reception range of a receiver, at any point on the globe. One of the signals that the satellites transmit is a signal at frequency L1, which is used as a carrier to modulate a data signal that is itself modulated with a Code Division Multiple Access (CDMA) code, commonly referred to as the C/A code. The CDMA code that is used by each satellite is unique to the satellite, but it is publicly known, which allows the receiver to discriminate, or detect, the individual signal of each of the satellites in the presence of signals from the other satellites and in the presence of noise. Actually, each satellite transmits at least one other signal, employing the same carrier frequency that is shifted 90 degrees. This second signal is modulated by another code, known as the P(Y) code. The P(Y) code is either the P, which is publicly known, or the encrypted Y code. Today, all satellites use the Y code and, consequently, the resulting transmitted signal that is encoded with the Y code cannot be used by anyone other than those who have the decryption algorithm and the key. Each satellite transmits yet another signal, on frequency L2, but the disclosure herein focuses on frequency L1 only. It should be understood that the principles disclosed herein apply to L1, L2, or any of the new frequencies that are planned for satellite navigation.

Because the invention that is disclosed herein is illustrated by way of an example that is based on the pervasive GPS system, the following gives an abbreviated review of the GPS signals and the processing that takes place in a conventional GPS receiver. It should be kept in mind that the deficiency in the GPS system that is mentioned later is found in all other non-encrypted systems, and that the applicability of the invention disclosed herein extends beyond the GPS system. It should be kept in mind, therefore, that terms referring to global positioning (without initial letters being capitalized) refers to the terms generically, and not necessarily solely to GPS.

A conventional GPS receiver, shown in FIG. 1, simultaneously receives a number of satellite signals on frequency L1, where the signal transmitted by satellite n can be expressed as $$S_{transmitted} = A^n D^n(t) x_{C/A}^n(t) \cos(2\pi(f_{L1})t + \phi_1) + B^n D^n(t) x_Y^n(t) \sin(2\pi(f_{L1})t + \phi_1) \quad (1)$$

where $D^n(t)$ is the data signal, $x_{C/A}^n(t)$ is the C/A code signal assigned to satellite n, $f_{L1}$ is the frequency of the carrier, and $\phi_1$ is the phase of the carrier relative to the beginning of the data and code signals.

A GPS receiver can engage in the processing of signals as if all of the possible satellites are present but, of course, some of the satellites are not within range of the GPS receiver's antenna so the processing results for those satellites are not viable. The following analysis follows the signal of only one satellite and, for sake of simplicity, superscript n is omitted from the equations, and the C/A subscript is shortened to C.

The transmitted signal is subjected to transit time delay to the receiver, $\tau$, and the signal that is received by a receiver's antenna experiences a Doppler frequency shift, $f_D$, due to the satellite's movement in its orbit and possible receiver motion. Also, the transmitter and the receiver do not have a common clock, which means that even when the transmitter and the receiver clocks are at identical frequency, there is, nevertheless, a phase difference between them. Thus, the received signal thus can be expressed as $$S_{received} = AD(t-\tau)x_C(t-\tau)\cos(2\pi(f_{L1}+f_D)(t-\tau)+\phi_1) + BD(t-\tau)x_Y(t-\tau)\sin(2\pi(f_{L1}+f_D)(t-\tau)+\phi_1) \quad (2)$$

or simplified to $$S_{received} = AD(t-\tau)x_C(t-\tau)\cos(2\pi(f_{L1}+f_D)t+\phi_1-\phi_2) + BD(t-\tau)x_Y(t-\tau)\sin(2\pi(f_{L1}+f_D)t+\phi_1-\phi_2) \quad (3)$$

As shown in FIG. 1, the received signal is amplified in element 10, conventionally downshifted to a preselected intermediate frequency (IF) by multiplying the received signal in element 12 by signal $$\sin(2\pi(f_{L1}+f_{IF})t+\phi_3) \quad (4)$$

and passing the resulting signal through low pass filter 15. The signal of equation (4) is generated from reference oscillator 20 by frequency synthesizer 22, where $\phi_3$ is the phase of the locally generated signal (relative to the beginning of the data and code signals at the transmitting satellite which, of course, is unknown). The result at the output of the low pass filter is $$S_{downshifted} = AD(t-\tau)x_C(t-\tau)\cos(2\pi(f_{IF}+f_D)t+\phi_1-\phi_2-\phi_3) + BD(t-\tau)x_Y(t\tau)\sin(2\pi(f_{IF}+f_D)t+\phi_1-\phi_2-\phi_3) \quad (5)$$

or simplified to $$S_{downshifted} = AD(t-\tau)x_C(t-\tau)\cos(2\pi(f_{IF}+f_D)t+\theta_1) + BD(t-\tau)x_Y(t-\tau)\sin(2\pi(f_{IF}+f_D)t+\theta_1). \quad (6)$$

It may be noted that the above-described use of downshifting by use of an IF modulator 12 and low pass filter 15 is illustrative, and that the A/D can be connected directly to amplifier 10 and controlled to generate a digital signal as if it were downshifted as shown in FIG. 1.

The output signal of low pass filter 15 is digitized in A/D converter 18 and applied to a combination of processor 100 and associated memory 110 where the remainder of the processing takes place.

The processing begins with a signal acquisition (software) module that includes a code generator element and a carrier generation module. The code generation module develops signal $$x_C(t-\hat{\tau}), \quad (7)$$

where $\hat{\tau}$ is an estimate of $\tau$, and the carrier generator module creates two signals that may be viewed as the phasor $$\Psi = \cos(2\pi(f_{IF}+\hat{f}_D)t+\theta_1) - i\sin(2\pi(f_{IF}+\hat{f}_D)t+\theta_1), \quad (8)$$

where $\hat{f}_D$ is an estimate of the Doppler frequency shift $f_D$, and $\hat{\theta}_1$ is an estimate of the phase $\theta_1$. Multiplying the received (and downshifted) signal of equation (6) by the code signal of equation (7) and the phasor of equation (8) and then integrating the product over a preselected interval that is long enough to reliably detect a correlation peak (for example, more than one period of the C/A code) yields:

$$\int F_C \Psi \cos(2\pi(f_{IF}+f_D)t+\theta_1)] + \int F_Y \Psi \sin(2\pi(f_{IF}+f_D)t+\theta_1)] \quad (9)$$

where $$F_C = AD(t-\tau)x_C(t-\tau)x_C(t-\hat{\tau}) \text{ and } F_Y = BD(t-\tau)x_Y(t-\tau)x_C(t-\hat{\tau}) \quad (10)$$

Equation (9) expands to $$S_I + S_Q = \quad (11)$$

$$\int F_C \left\{ \begin{array}{l} \cos(2\pi(f_{IF}+\hat{f}_D)t+\hat{\theta}_1)\cos(2\pi(f_{IF}+f_D)t+\theta_1) - \\ i\sin(2\pi(f_{IF}+\hat{f}_D)t+\hat{\theta}_1)\cos(2\pi(f_{IF}+f_D)t+\theta_1) \end{array} \right\} +$$

$$\int F_Y \left\{ \begin{array}{l} \cos(2\pi(f_{IF}+\hat{f}_D)t+\hat{\theta}_1)\sin(2\pi(f_{IF}+f_D)t+\theta_1) - \\ i\sin(2\pi(f_{IF}+\hat{f}_D)t+\hat{\theta}_1)\sin(2\pi(f_{IF}+f_D)t+\theta_1) \end{array} \right\}$$

or to $$S_I + S_Q = \int F_C \left\{ \begin{array}{l} \cos(2\pi(2f_{IF}+f_D+\hat{f}_D)t+\theta_1+\hat{\theta}_1) + \\ \cos(2\pi(f_D-\hat{f}_D)t+\theta_1-\hat{\theta}_1) - \\ i\sin(2\pi(2f_{IF}+f_D+\hat{f}_D)t+\theta_1+\hat{\theta}_1) + \\ i\sin(2\pi(f_D-\hat{f}_D)t+\theta_1-\hat{\theta}_1) \end{array} \right\} + \quad (12)$$

$$\int F_Y \left\{ \begin{array}{l} \sin(2\pi(2f_{IF}+f_D+\hat{f}_D)t+\theta_1+\hat{\theta}_1) + \\ \sin(2\pi(f_D-\hat{f}_D)t+\theta_1-\hat{\theta}_1) + \\ i\cos(2\pi(2f_{IF}+f_D+\hat{f}_D)t+\theta_1+\hat{\theta}_1) - \\ i\cos(2\pi(f_D-\hat{f}_D)t+\theta_1-\hat{\theta}_1) \end{array} \right\}.$$

Since, as indicated above, $$F_Y = BD(t-\tau)x_Y(t-\tau)x_C(t-\hat{\tau}), \quad (13)$$

and the C/A code is orthogonal to the Y code, the second integral of equation (12) yields zero. Also, the integration acts like a low pass filter that discards the high frequency signals of $\cos 2\pi(2f_{IF}+f_D+\hat{f}_D)t$ and $\sin 2\pi(2f_{IF}+f_D+\hat{f}_D)t$, leaving $$S_I + iS_Q = \int F_C \left\{ \begin{array}{l} +\cos(2\pi(f_D-\hat{f}_D)t+\theta_1-\hat{\theta}_1) \\ +i\sin(2\pi(f_D-\hat{f}_D)t+\theta_1-\hat{\theta}_1) \end{array} \right\}. \quad (14)$$

It can be demonstrated that $S_I^2 + S_Q^2$ equals $$S_I^2 + S_Q^2 = \left( \int F_C \cos(2\pi(f_D-\hat{f}_D)t+\theta_1-\hat{\theta}_1) \right)^2 + \quad (15)$$

$$\left( \int F_C \sin(2\pi(f_D-\hat{f}_D)t+\theta_1-\hat{\theta}_1) \right)^2$$

$$= \left( \int F_C \cos 2\pi(f_D-\hat{f}_D)t \right)^2 +$$

$$\left( \int F_C \sin 2\pi(f_D-\hat{f}_D)t \right)^2$$

which is independent of $(\theta_1-\hat{\theta}_1)$. It can be also demonstrated that good estimates for $\tau$, and $f_D$ are attained when code generation module is adjusted as to introduce a delay, $\hat{\tau}$, and the carrier generator module is adjusted as to the introduced $\hat{f}_D$ so as to maximize $S_I^2 + S_Q^2$.

For the more visually inclined reader, FIG. 2 shows a diagrammatic representation of the processing that takes place in the acquisition module.

The task of the acquisition module is to come up with a first-cut approximation of the delay and the Doppler frequency shift. A refinement of the approximations takes place in a tracking module, whose function is to both refine the estimates and track the changes in $\tau$, $f_D$ and $\theta_1$ as conditions change, and whose diagrammatic representation is shown in FIG. 3.

The tracking module contains a phase lock loop comprising multiplier 31 that multiplies the $S_{downshifted}$ signal of equation (6) by the phasor of equation (8) provided by numerically controlled oscillator (carrier NCO) 32. The output of multiplier 31 is multiplied in multiplier 33 by the code signal obtained from code generator 38. The output of multiplier 33 is integrated in module 34 and applied to discriminator 35, which develops a carrier error signal $(\theta_1-\hat{\theta}_1)$ that controls the frequency of the carrier NCO.

The output of multiplier 31 is also applied to multiplier 36, where it is multiplied by the code signal that is generated by element 38, but delayed by half of the duration of code C/A chip; i.e., $$x_C(t-\hat{\tau}-T_C/2) \quad (16)$$

and to multiplier 37, where it is multiplied by the code signal that is generated by element 38, but advanced by half of the duration of code C/A chip; i.e., $$x_C(t-\hat{\tau}+T_C/2) \quad (17)$$

The outputs of multipliers 36 and 37 are integrated in elements 41 and 42, respectively, and applied to discriminator 39 which develops a delay error signal $(t-\hat{\tau})$ that is applied to code generator 38, controlling the frequency of the clock that generates the code.

While in both elements 32 and 38 the frequency of a clock is controlled by the respective discriminators, the result is that the generated carrier frequency phasor that is applied to multiplier 31 is in the form $$\cos(2\pi(f_{IF}+\hat{f}_D)t+\hat{\theta}_1) - i\sin(2\pi(f_{IF}+\hat{f}_D)t+\hat{\theta}_1) \quad (18)$$

with the approximations $\hat{f}_D$ and $\hat{\theta}_1$ tracking closely the $f_D$ and $\theta_1$ of equation (6), and the generated code $$x_C(t-\hat{\tau}) \quad (19)$$

has a $\hat{\tau}$ that is a close estimate of $\tau$.

The code and the carrier measurement are applied to subsequent modules (not shown) that decode the navigation message, determine satellite ephemeris, and compute the pseudo-range, and with corresponding pseudo-ranges obtained by processing other satellites, the physical location of the receiver is computed (through quadralateration) and displayed.

All of the above is conventional, and the reader is invited to peruse the book "Global Positioning System" by Misra and Enge, Ganga-Jamuna Press, 2006 for further details. In general, the GPS literature is enormous. It describes alternate implementation to the above, where, for example, the code and carrier removal processes described by equations (7), (8) and (9) are done in different order. It also describes implementations that use correlator spacings other than those chosen in equations (16) and (17). The literature is also replete with discriminator strategies that differ from the simple "early minus late" strategy described here.

In commercial applications the C/A code is publicly known and, consequently, GPS receivers are vulnerable to spoofing. A hostile party can generate a facsimile of one or more satellite signals that carry incorrect information, and a GPS receiver that accepts the bogus signals will compute an incorrect position and, in fact, may be caused to compute a position that the hostile party wishes to have the receiver compute. However, spoofing is not a problem for those who are able to use the Y code because this code is not publicly known, so a hostile party cannot create a signal that appears bona fide. This problem is not unique to GPS receivers, of course. It is endemic to all global positioning systems that rely on insecure signals.

The primary object of this disclosure is to create a method and a means for having confidence that a global position computation, or an assertion based on a global position, is bona fide.

Another object of this disclosure is to have global positioning computation devices, such as GPS receivers that, without having access to the information contained in a secure signal, or access to the code that makes the information secure (henceforth, the unknown signal), such as the Y code in the GPS signal, are nevertheless able to withstand spoofing attempts, for example an attack by a rogue user with access to an authorized receiver or an attack by a malicious agent attempting to dupe legitimate users.

Yet another object of this invention is to determine the location of a device by processing the unknown signal jointly at the two stations (or locations).

Still another object of this invention is to authenticate a claim regarding a location that such a computing device asserts in connection with information services, such as financial services.

SUMMARY OF THE INVENTION

The above and other objects are achieved, and an advance in the art is realized by effectively employing the unknown signal (e.g., the Y code) for authentication, and more particularly by receiving a first signal from a source (e.g., satellite n), which signal contains the unknown signal and is also adapted to make a statement (e.g., an assertion of a global position), receiving a second signal that also contains an unknown signal with which information is associated that is different from, but related to, the information associated with the first unknown signal, and processing the two unknown signals to authenticate the statement. Confidence in the authentication results from one of the signals being received in a manner that insures it being not affected by hostile signals that perhaps affect the first signal. Illustratively, the second signal is received by another receiver that is remote from the first receiver.

In one illustrative embodiment, the first receiver is an improved GPS receiver whose assertions of global position one wishes to authenticate, and the second receiver is an improved GPS receiver that, to the extent desired by the party that wishes to trust the authentication, is known to receive bona fide satellite signals. The first improved GPS receiver processes the signal that is putatively received from satellite n to develop accurate estimates of transit delay, Doppler frequency shift and carrier phase shift for the received signal— which estimates are typically developed in the course of determining the receiver's global position—and sends to the second improved GPS receiver a signal (signal A) that accounts for the estimated transit delay, Doppler frequency shift and carrier phase shift. The second improved GPS receiver employs signal A as well as a signal (signal B) that is developed from the signal the second receiver received from satellite n, and correlates the Y component signals in signals A and B. A test of the correlation determines whether to authenticate signal A. For example, a correlation that exceeds a selected threshold is concluded to be an authentication that the signal sent by the first improved GPS receiver indeed originated from satellite n.

DETAILED DESCRIPTION

An important realization that is disclosed herein is that given a signal from a source that comprises a secure, though unknown, component and a corresponding known but not secure component, where both the known and unknown components are similarly affected by physical conditions and those effects are computed for the known component, it is possible to authenticate the known component by using a second signal that is a changed version of the signal from the source—where either the second signal or the given signal is known to be bona fide—through use of the unknown components of the given signal and of the second signal.

The following applies this insight to the problem where the source is one or more satellites that output signals which are used for various purposes, including global positioning; and more particularly to the aforementioned problem in the context of the Global Positioning System. It should be understood, however, that the principles disclosed herein are not limited to the illustrative embodiment presented below.

Figure 4:
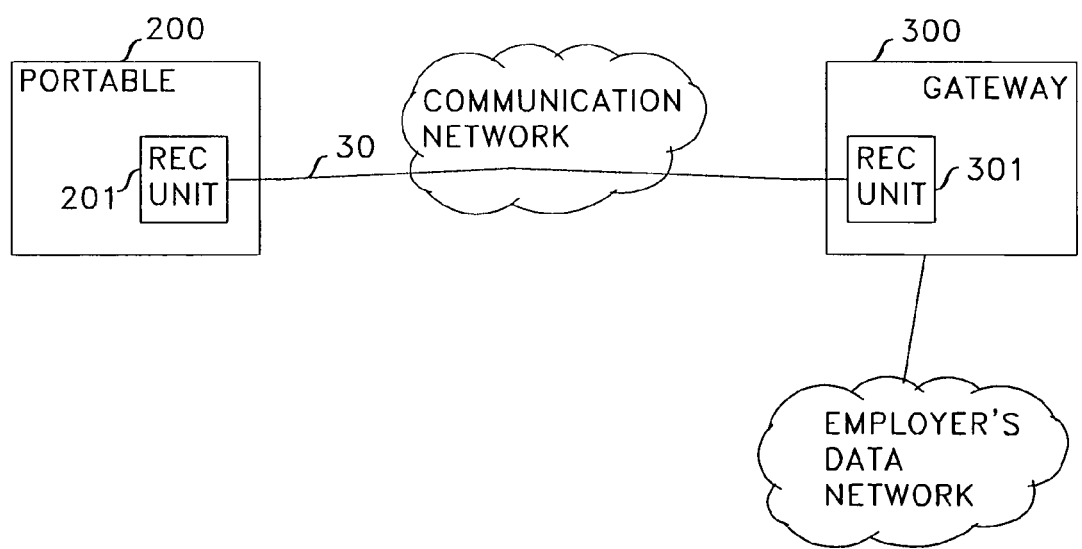
FIG. 4 depicts an arrangement where a first GPS receiving unit that is constructed in accord with the principles disclosed herein and which is embedded in a portable computer of an employee is communicating to a second GPS receiving unit that is correspondingly constructed in accord with the principles disclosed herein in a gateway to an employer's data network.

FIG. 4 represents one illustrative embodiment of the invention disclosed herein, where unit 201 is a GPS receiver that is modified in accord with the principles disclosed herein and which, illustratively, is embedded in portable computer 200 of an employee. For security reasons, the employer of this employee wishes to preclude access by that portable computer relative to at least some of the employer's resources (e.g., files pertaining to some project) unless that portable computer is at one of the employer's numerous locations. Therefore the employer installs unit 301 in gateway 300, which is the point of entry to the employer's data network of the employer, and unit 301 is a GPS receiver that is also modified in accord with the principles disclosed herein. For the illustrative example of FIG. 4, it is presumed that the employer is satisfied that receiver 301 receives bona fide satellite signals.

In addition to units 201 and 301, FIG. 4 includes a communication link 30 by which communication can flow between units 201 and 301. For purposes of the global location authentication that is described below, the communication link does not need to be secure. It is expected, however, that in some applications this link will need to be secure; for example, where this communication link is also used to send back authorizations.

Unit 201 receives the signals from a number of satellites and processes them as described above to compute the global position of unit 201 based on the received signals. In the course of processing the signal of satellite n, the signal of equation (12) is developed, and as part of developing this signal unit 201 creates a signal that corresponds to the received (and downshifted) signal of equation (6) multiplied by the phasor of equation (8). That is, unit 201 creates the signal (downshifted, carrier wipeoff relative to satellite n, but not C/A code wipeoff):

$$A^A D^A(t-\tau^A) x_C^A(t-\hat{\tau}^A) \begin{Bmatrix} \cos(2\pi(2f_{IF}+f_D^A+\hat{f}_D^A)t+\theta_1^A+\hat{\theta}_1^A) + \\ \cos(2\pi(f_D^A-\hat{f}_D^A)t+\theta_1^A-\hat{\theta}_1^A) - \\ i\sin(2\pi(2f_{IF}+f_D^A+\hat{f}_D^A)t+\theta_1^A+\hat{\theta}_1^A) + \\ i\sin(2\pi(f_D^A-\hat{f}_D^A)t+\theta_1^A-\hat{\theta}_1^A) \end{Bmatrix} +$$

$$B^A D^A(t-\tau^A) x_Y^A(t-\hat{\tau}^A) \begin{Bmatrix} \sin(2\pi(2f_{IF}+f_D^A+\hat{f}_D^A)t+\theta_1^A+\hat{\theta}_1^A) + \\ \sin(2\pi(f_D^A-\hat{f}_D^A)t+\theta_1^A-\hat{\theta}_1^A) + \\ i\cos(2\pi(2f_{IF}+f_D^A+\hat{f}_D^A)t+\theta_1^A+\hat{\theta}_1^A) - \\ i\cos(2\pi(f_D^A-\hat{f}_D^A)t+\theta_1^A-\hat{\theta}_1^A) \end{Bmatrix}. \quad (20)$$

where the superscript A designates the signal of unit 201.

A low pass filter discards the terms with frequency on the order of $2\pi f_{IF}$, leaving $$A^A D^A(t-\tau^A) x_C^A(t-\hat{\tau}^A) \begin{Bmatrix} \cos(2\pi(f_D^A-\hat{f}_D^A)t+\theta_1^A-\hat{\theta}_1^A) + \\ i\sin(2\pi(f_D^A-\hat{f}_D^A)t+\theta_1^A-\hat{\theta}_1^A) \end{Bmatrix} +$$

$$B^A D^A(t-\tau^A) x_Y^A(t-\hat{\tau}^A) \begin{Bmatrix} \sin(2\pi(f_D^A-\hat{f}_D^A)t+\theta_1^A-\hat{\theta}_1^A) - \\ i\cos(2\pi(f_D^A-\hat{f}_D^A)t+\theta_1^A-\hat{\theta}_1^A) \end{Bmatrix} \quad (21)$$

which can be written as $$S_I^A + i S_Q^A \quad (22)$$

where $$S_I^A = A^A D^A(t-\tau^A) x_C^A(t-\tau^A) \cos(2\pi(f_D^A-\hat{f}_D^A)t + \theta_1^A-\hat{\theta}_1^A) + B^A D^A(t-\tau^A) x_Y^A(t-\tau^A) \sin(2\pi(f_D^A-\hat{f}_D^A)t+\theta_1^A-\hat{\theta}_1^A) \quad (23)$$

and $$S_Q^A = A^A D^A(t-\tau^A) x_C^A(t-\tau^A) \sin(2\pi(f_D^A-\hat{f}_D^A)t+\theta_1^A-\hat{\theta}_1^A) - B^A D^A(t-\tau^A) x_Y^A(t-\tau^A) \cos(2\pi(f_D^A-\hat{f}_D^A)t+\theta_1^A-\hat{\theta}_1^A). \quad (24)$$

Approach A

In accordance with a first approach, unit 201 sends the quadrature signal of equation (24) to unit 301 over link 30, together with identification of the satellite whose signal the sent signal represents.

Unit 301 develops a similar signal; that is, $$S_Q^B = A^B D^B(t-\tau^B) x_C^B(t-\hat{\tau}^B) \sin(2\pi(f_D^B-\hat{f}_D^B)t+\theta_1^B-\hat{\theta}_1^B) - B^B D^B(t-\tau^B) x_Y^B(t-\hat{\tau}^B) \cos(2\pi(f_D^B-\hat{f}_D^B)t+\theta_1^B-\hat{\theta}_1^B). \quad (25)$$

The transit time from a satellite to unit 201, $\tau^A$, is different from the transit time from the same satellite to unit 301, $\tau^B$, so in accord with the first approach, the signal received from unit 201 is delayed by $\delta$, where $\delta$ may be a positive or negative quantity, and a product of the signals $S_Q^A$ (delayed) and $S_Q^B$ is integrated; i.e., $$S = \int [S_Q^A(\text{delayed}) \times S_Q^B] \quad (26)$$

$$= \int \begin{Bmatrix} \begin{bmatrix} A^A D^A\left(\dfrac{t-}{\tau^A-}\delta\right) x_C^A\left(\dfrac{t-}{\hat{\tau}^A-}\delta\right) \sin\begin{pmatrix} 2\pi(f_D^A-\hat{f}_D^A)(t-\delta) + \\ \theta_1^A-\hat{\theta}_1^A \end{pmatrix} - \\ B^A D^A\left(\dfrac{t-}{\tau^A-}\delta\right) x_Y^A\left(\dfrac{t-}{\hat{\tau}^A-}\delta\right) \cos\begin{pmatrix} 2\pi(f_D^A-\hat{f}_D^A)t + \\ \theta_1^A-\hat{\theta}_1^A \end{pmatrix} \end{bmatrix} \times \\ \begin{bmatrix} A^B D^B(t-\tau^B) x_C^B(t-\hat{\tau}^B) \sin(2\pi(f_D^B-\hat{f}_D^B)t+\theta_1^B-\hat{\theta}_1^B) - \\ B^B D^B(t-\tau^B) x_Y^B(t-\hat{\tau}^B) \cos(2\pi(f_D^B-\hat{f}_D^B)t+\theta_1^B-\hat{\theta}_1^B) \end{bmatrix} \end{Bmatrix}$$

which can be written in more manageable form as $$S = \int [XU - YU - XW + YW] \quad (27)$$

where $$X = A^A D^A(t-\tau^A-\delta) x_C^A(t-\tau_A-\delta) \sin(2\pi(f_D^A-\hat{f}_D^A)t+\theta_1^A-\hat{\theta}_1^A) \quad (28)$$

$$Y = B^A D^A(t-\tau^A-\delta) x_Y^A(t-\tau_A-\delta) \cos(2\pi(f_D^A-\hat{f}_D^A)t+\theta_1^A-\hat{\theta}_1^A) \quad (29)$$

$$U = A^B D^B(t-\tau^B) x_C^B(t-\tau_A) \sin(2\pi(f_D^B-\hat{f}_D^B)t+\theta_1^B-\hat{\theta}_1^B) \quad (30)$$

and $$W = B^B D^B(t-\tau^B) x_C^B(t-\tau_A) \cos(2\pi(f_D^B-\hat{f}_D^B)t+\theta_1^B-\hat{\theta}_1^B). \quad (31)$$

As indicated above, the estimates of $\tau^A$, $\hat{f}_D^A$, and $\hat{\theta}_1^A$ are quite good, and so are the estimates of $\tau^B$, $\hat{f}_D^B$, and $\hat{\theta}_1^B$. Given accurate information about the phase shifts, unit 301 can perform coherent demodulation. Consequently, over the integration interval that needs to be employed for equation (26), the sin( ) terms can be replaced with 0 (i.e., X=U=0), and the cos( ) terms can be replaced with their respective coefficients. This leads to $$S = B^A B^B \int D^A(t-\tau^A \delta) D^B(t-\tau^B) x_Y^A(t-\tau^A-\delta) x_Y^B(t-\tau^B). \quad (32)$$

Clearly, when the signal of unit 301 is bona fide and, therefore, $x_Y^B(t-\tau^B)$ is equal to $x_Y^A(t-\tau^A)$,
$D^A(t-\tau^A)$ is equal to $D^B(t-\tau^B)$, and
$(D^B(t-\tau^B))^2 = 1$, because the message signal, D, can only have $\pm 1$ values.

Thus, the value of S in equation (32) is maximum when $\delta = \tau^B - \tau^A$; i.e., $$S = B^A B^B. \quad (33)$$

Thus, without knowing the Y code signal $x_Y(t-\tau)$, the arrangement of FIG. 4 executes a method that recognizes—by the value of S for different values of δ—when a signal that is received by unit 201 and a signal that is received by unit 301 originate from a given source that outputs a signal that is modulated with a signal $x_Y(t-\tau)$, when that is the case; and conversely, recognizes when one of the signals is not from the given source.

Figure 1:
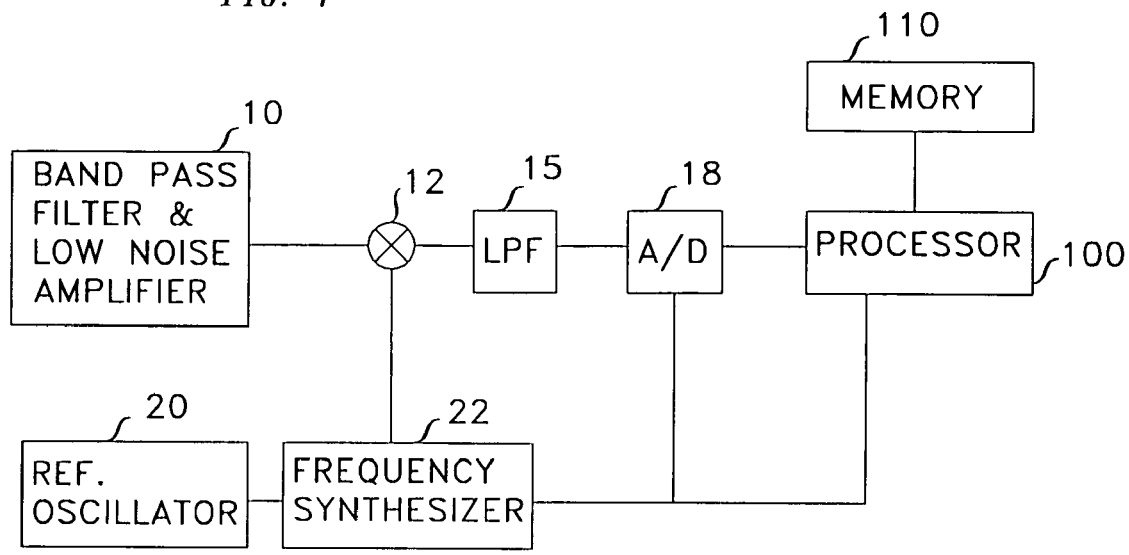
FIG. 1 is a block diagram of a GPS receiver.
Figure 2:
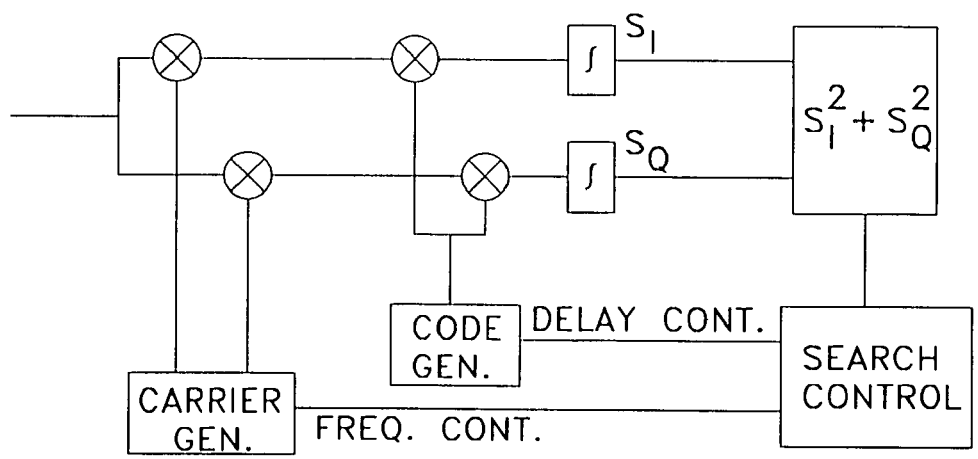
FIG. 2 is a block diagram illustrating the processing performed in an acquisition module of a GPS receiver.
Figure 3:
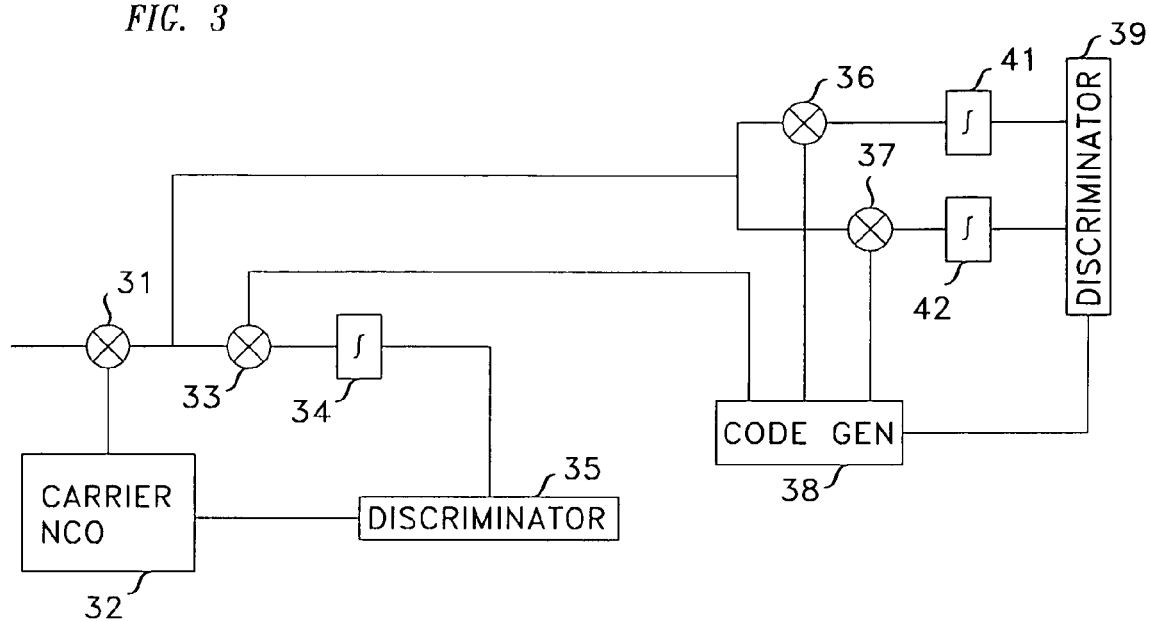
FIG. 3 is a block diagram illustrating the processing performed in a tracking module of a GPS receiver.

One can appreciate that the receiver shown in FIG. 1 includes processor 100 and memory 110 that operate on digital signals and, therefore, can be implemented in a programmed general purpose processor. Similarly, unit 201 can include hardware elements that correspond to elements 10, 12, 15, 18, 20 and 22, and employ the computing power of portable computer 200 to carry out the various calculations disclosed above, which in the FIG. 1 embodiment would be performed in element 100 and its associated memory 110. The software that is necessary in unit 201 to augment the conventional receiver advantageously implements a filter to develop the signal of equation (24) from the signal of equation (20), and a module for sending to line 30 the signal of equation (24), and the identity of the satellite whose signal is represented by the sent signal. This extremely modest addition to the software is quite simple, which a skilled artisan can create without undue experimentation in any one of a number of techniques that are well known in the art.

Figure 5:
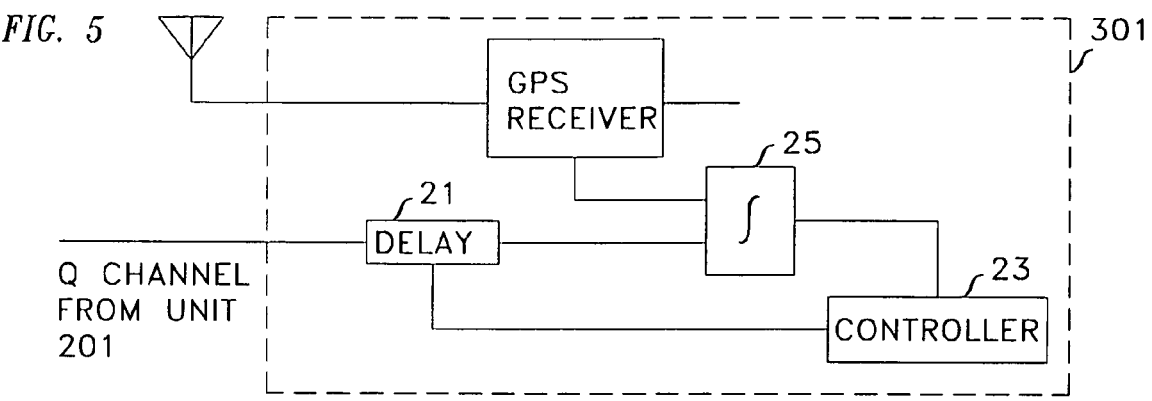
FIG. 5 illustrates the processing within the second GPS receiver when the first receiver obtains good estimates of transit delay, Doppler frequency shift and carrier phase shift, and provides a signal to the second GPS receiver with carrier wipeoff already carried out.

The modification to the GPS receiver in unit 301 is somewhat greater than in unit 201, but still quite simple to implement in a programmed general purpose processor (which may be part of the processor that gateway 200 employs). FIG. 5 diagrammatically shows unit 301 to include a port to receive the signal sent by unit 201, a delay unit 21 that is responsive to the equation (25) signal, and a correlation module 25 that is responsive to the delayed signal at the output of delay unit 21 and to the signal of equation (25) that is extracted from the signals that the conventional GPS receiver creates in the course of determining its global position.

The correlation unit computes the integral of equation (26) with function S=function A( ), and provides the developed value S to controller module 23. The correlation function provides an indication of the degree to which signal A, with some delay, is the same as signal B. When they are indeed the same, then the correlation outputs a high value, or a peak. Bogus signals, even when they are somewhat similar to the authentic signal, will result in lower correlation value regardless of what delay is chosen. One simple way, therefore, is to compare the strongest correlation peak to the next strongest peak. This is illustrated by the following function that module 23 executes:

```
for δ (-N,+N,ΔN)
do
    Call S=function A(δ)
    If S > S_highWaterMark then {
        S_nextHighest = S_highWaterMark
        S_highWaterMark = S }
Done
if ( S_highWaterMark / S_nextHighest ) > Threshold then output "OK"
else output "NOT OK"
end if
``` where N is greater than the expected delay difference $(\tau^B-\tau^A)$, and ΔN is the increment that a designer might choose to employ in seeking the maximum in the correlation function of equation (26). Of course, if unit 201 were to send the value of $\hat{\tau}^B$ along with the signal of equation (24) then the range of N can be reduced significantly because it would be expected to find a maximum at δ=0.

It should be noted that the above is just one embodiment of the test that is performed on the correlation results. It may be noted, for example, that in embodiments that employ high sampling rates several large peaks may appear, but those peak are artifacts, and in such embodiments other tests are typically employed that factor in the sampling rate (as related to ΔN) and the relative position of the peaks, to determine which points to compare for the threshold.

It is recognized that in order to compute a global position, the signal of more than one satellite must be used. Therefore, authenticating the signal of one satellite, as disclosed above, does not, ipso facto, guarantee that unit 201 is not impacted by a bogus signal relative to the signal of another satellite that it is using for its global position computations. If it is so impacted, then one cannot trust its assertion regarding its global position. However, time can be divided into fairly long-duration frames, and during each frame a different one of the signals that unit 201 employs can be sent to unit 301 for authentication. If all of the signals are authenticated, then one can trust that the position asserted by unit 201 is valid in the sense that it has not been compromised by a hostile party causing it to receive bogus signals.

It should also be noted that the location can be computed using more than the minimum number of satellites (4 satellites to compute latitude, longitude, elevation and GPS time) and that not all of the satellite signals need to be authenticated. Having a majority of the signals authenticated can be used to test the consistency of non-authenticated signals, provided that the location estimate reported by unit 201 agrees with the location estimate developed using a subset of authenticated satellites.

Once confidence is gained about the signals provided by unit 201 that are used to compute a global position of unit 201 then one can also have confidence in an identification of the global position by unit 201 as asserted by unit 201. This assumes, of course, that unit 201 does compute its global position (in a completely conventional way) and reports its position to unit 301.

Alternatively, instead of trusting unit 201's assertion of its position, it is possible to have unit 301 compute the position of unit 201. This secure position determination is achieved by unit 201 sending the equation (24) signals of a number of satellites that is necessary to compute a position. Noting that the δ determined relative to a satellite informs of the transit delay from the satellite to unit 201 $(\tau^B=\tau^A+\delta)$, given a sufficient number of transit delays (combined with unit 301's global position and information about the satellites' locations) the global position of unit 201 can be ascertained through conventional calculations.

It may be appreciated that authenticating an asserted position, or securely determining a position, does not need to be done continually. At times the global position of unit 201 is immaterial. At other times, one can assume that unit 201 has not significantly wandered off the authenticated position. Therefore, in many applications it is acceptable if unit 201 sends only a signal segment, or snapshot, to unit 301. In other applications it may be advisable to send a signal snapshot on some regular basis.

It should be appreciated that the FIG. 4 arrangement where unit 201 is within computer 200 and utilizes the computing power that is otherwise available in the computer is merely illustrative. Unit 201 may have the full computing capabilities within itself (note the processor in unit 201), and it may be a stand-alone item, an item that is pluggable into a device such as portable 200, or it may be permanently (or semi-permanently) attached to an article and so transported from place to place; e.g., attached to a shipping container.

It should also be appreciated that unit 201 may contain a memory for storing one or more signal segments (raw, or processed), and the stored information may be communicated to unit 301 at some later time (i.e., a non-real time operation) by relatively direct connection; that is, without the use of a communication network that is shown in FIG. 4. The transfer of information may be initiated by a push-button switch in unit 201 (not explicitly shown in FIG. 4), by an electronic instruction from unit 301, by physically transferring the memory from unit 203 (see FIG. 7) to an appropriate connector on unit 301, or by some other conventional means.

The above discloses an arrangement where unit 201 sends to unit 301 the signal of equation (24), which is the signal after carrier wipeoff relative to satellite n. When sending the signals of M satellites, M such signals need to be sent. There are certainly applications where this is acceptable but if the M signals need to be sent concurrently, then the bandwidth of path 30 must be M times greater than the bandwidth required to send one signal.

Figure 6:
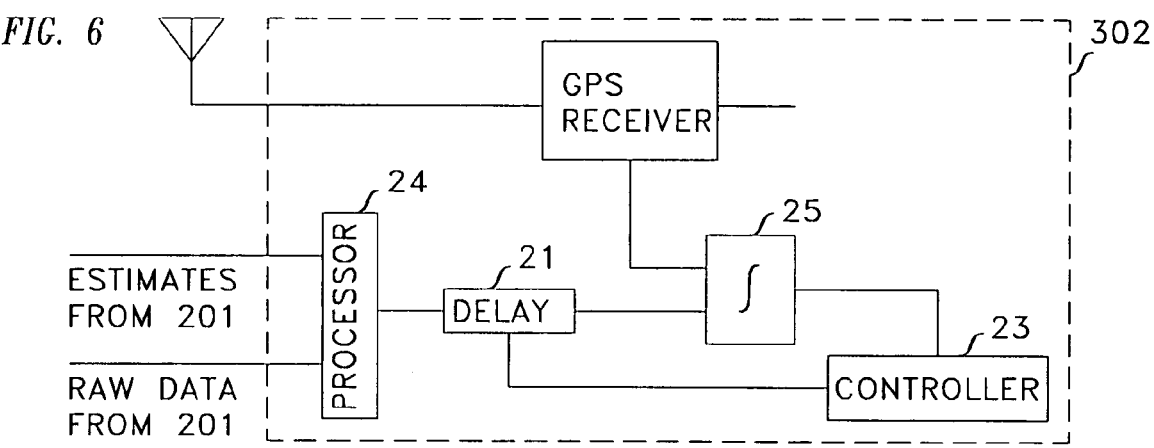
FIG. 6 illustrates the processing within the second GPS receiver when the first receiver obtains good estimates of transit delay, Doppler frequency shift and carrier phase shift, and provides to the second GPS receiver a the raw signal that contains information about all satellites whose signals are received by the first GPS receiver, and the transit delay, Doppler frequency shift and carrier phase shift estimates of all of those satellites.

In an alternative embodiment, shown in FIG. 6, rather than sending quadrature channel signal as described above, unit 201 sends to unit 302 the raw data and also sends the computed Doppler frequency and carrier phase estimates for at least each of the satellites that is used in computing its global position. The difference between unit 301 and 302 is that in unit 302 the raw data and the estimates are processed in processor 24 to develop the quadrature channel signal of equation (24). The bandwidth requirement (for sending the signal from unit 201 to unit 301) is essentially unchanged from the bandwidth needed for one satellite signal.

In some applications a small size for the device (unit 200 in FIG. 4) may be more important than the ability of the device to know its own global position. Indeed, in some applications it may be totally unimportant for the GPS receiver to know its location but, rather, it may suffice for the other receiver (e.g., unit 301 in FIG. 4) to know where unit 200 is, or has been. In other words, there are applications where it may not be necessary for the GPS receiver do the processing that is associated determining its global position. To that end, unit 203 (FIG. 7) needs to merely send its raw signal to receiver 303 (FIG. 7), or record signal segments internally for future delivery to unit 303.

Approach B

Figure 7:
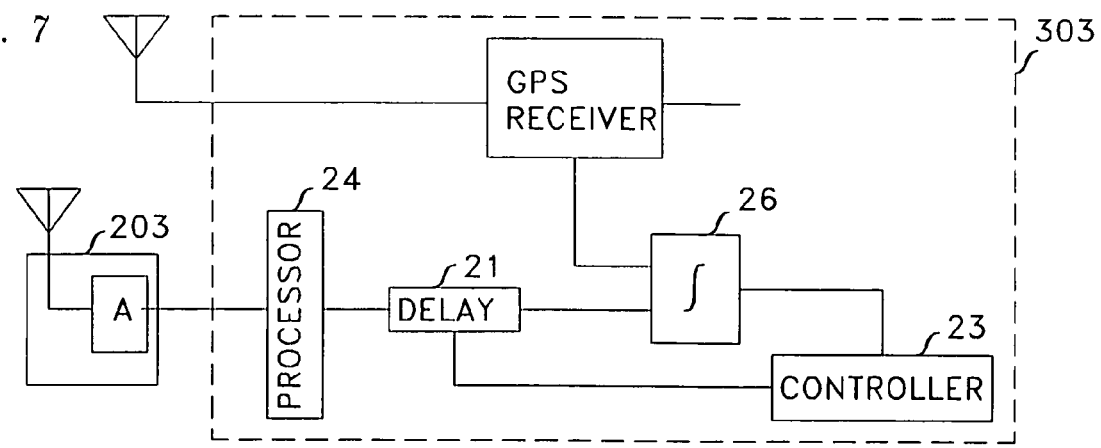
FIG. 7 illustrates the processing within the second GPS receiver when the signal that the first GPS receiver sends is the raw signal only.

FIG. 7 depicts an arrangement with the GPS receiver 203 that is optionally devoid of the processing that involves carrier wipeoff and code wipeoff. The receiver, 203, only downshifts the received signal and sends this raw data to receiver 303 (without any delay, Doppler shift, or phase estimates), together, perhaps with some general information about its presumed (or asserted) location. The raw data might be sent immediately, or stored in a local memory, and sent at a later time. In other words, the signal that is provided to receiver 303 by receiver 203 is:

$$S_{downshifted}^A = A^A D^A (t-\tau^A) x_C^A (t-\hat{\tau}^A) \cos(2\pi(f_{IF}-\hat{f}_D^A)t+\theta_1^A) - BD(t-\tau^A) x_Y^A (t-\hat{\tau}^A) \sin(2\pi(f_{IF}-\hat{f}_D^A)t+\theta_1^A) \quad (34)$$

and a rough location information which, from satellite orbit tables that are publicly known, an estimate $\hat{f}_D^A$ is obtained. The rough information may be in the form of an assertion as to the location of receiver 203. It is recognized that no information is available about the value of $\theta^A$, and that the estimate $\hat{f}_D^A$ is likely to be inaccurate but it is nevertheless helpful, as is demonstrated below. Absent information about $\theta^A$, processor 24 executes non-coherent demodulation and multiplies the incoming signal by $$\cos 2\pi (f_{IF}+\hat{f}_D^A)t + i \sin 2\pi (f_{IF}+\hat{f}_D^A)t \quad (35)$$

to result in $$A^A D^A(t-\tau^A) x_C^A(t-\tau^A) \left\{ \begin{array}{l} \cos\left(2\pi\left(2f_{IF}+f_D^A+\hat{f}_D^A\right)t+\theta_1^A\right) + \\ \cos\left(2\pi\left(f_D^A-\hat{f}_D^A\right)t+\theta_1^A\right) - \\ i\sin\left(2\pi\left(2f_{IF}+f_D^A+\hat{f}_D^A\right)t+\theta_1^A\right) + \\ i\sin\left(2\pi\left(f_D^A-\hat{f}_D^A\right)t+\theta_1^A\right) \end{array} \right\} + \quad (36)$$

$$B^A D^A(t-\tau^A) x_Y^A(t-\tau^A) \left\{ \begin{array}{l} \sin\left(2\pi\left(2f_{IF}+f_D^A+\hat{f}_D^A\right)t+\theta_1^A\right) + \\ \sin\left(2\pi\left(f_D^A-\hat{f}_D^A\right)t+\theta_1^A\right) + \\ i\cos\left(2\pi\left(2f_{IF}+f_D^A+\hat{f}_D^A\right)t+\theta_1^A\right) - \\ i\cos\left(2\pi\left(f_D^A-\hat{f}_D^A\right)t+\theta_1^A\right) \end{array} \right\}$$

and recognizing that a later integration operation operates as a low pass filter that discards the signal components that include the $2f_{IF}$ frequency, equation (34) can be simplified to $$S_1^A \circ S_Q^A = (W+X)+i(Y-z) \quad (37)$$

where $$W = A^A D^A(t-\tau^A) x_C^A(t-\tau^A) \cos(2\pi(f_D^A-\hat{f}_D^A)t+\theta_1^A) \quad (38)$$

$$X = B^A D^A(t-\tau^A) x_Y^A(t-\tau^A) \sin(2\pi(f_D^A-\hat{f}_D^A)t+\theta_1^A) \quad (39)$$

$$Y = A^A D^A(t-\tau^A) x_C^A(t-\tau^A) \sin(2\pi(f_D^A-\hat{f}_D^A)t+\theta_1^A) \quad (40)$$

and $$Z = B^A D^A(t-\tau^A) x_Y^A(t-\tau^A) \cos(2\pi(f_D^A-\hat{f}_D^A)t+\theta_1^A) \quad (41)$$

Delay element 21 of FIG. 7 introduces delay $\delta$, and element 26 in the FIG. 7 embodiment executes the integration $$S = \sqrt{(\int S_I^A (\text{delayed}) \times S_Q^B)^2 + (\int S_Q^A (\text{delayed}) \times S_Q^B)^2} . \quad (42)$$

Noting that equation (25) specifies $S_Q^B$, which can be expressed by $$S_Q^A = U+V$$

where $U = A^B D^B(t-\tau^B) x_C^B(t-\tau^B) \sin(2\pi(f_D^B-\hat{f}_D^B)t+\theta_1^B) \quad (43)$ and $$V = -B^B D^B(t-\tau^B) x_Y^B(t-\tau^B) \cos(2\pi(f_D^B-\hat{f}_D^B)t+\theta_1^B) \quad (44)$$

equation (42) can be expressed as $$S = \quad (45)$$
$$\sqrt{(\int(W'U+W'V+X'U+X'V))^2 + (\int(Y'U+Y'V+Z'U+Z'V))^2}$$

where the primed variables (e.g., W') are the delayed version of the unprimed variables (e.g., W).

A number of observations and approximations can be made that reduce the complexity of equation (45).

Since the approximations of the Doppler frequency and carrier phase shift for unit 303 signal are good, the U term can be replaced by 0, and the cos( ) term in the V term can be replaced by 1.

The W and the Y terms have the $x_C^A(t-\tau^A)$ code signal multiplier whereas the V term has the $x_Y^B(t-\hat{\tau}^A)$ code signal multiplier, and since the two codes are orthogonal to each other, the contributions of the WV and the YV terms to the integral is roughly 0

As indicated above, the estimate $\hat{f}_D^A$ is not necessarily an accurate estimate, but even it if a rough estimate, the resulting trigonometric function varies slowly relative to the chip rate of the Y code, which allows the non-trigonometric factors that are common to XV and ZV to be factored out, and then the sum of squared sin( ) and cos( ) terms that remain can be replaced by 1.

The above allows reducing equation (45) to $$S=B^A B^B \int D^A(t-\tau^A\delta) D^B(t-\tau^B) x_Y^A(t-\tau^A-\delta) x_Y^B(t-\tau^B), \quad (46)$$

so it is quite clear that the integration result exhibits a maximum when $\tau^A+\delta=\hat{\tau}^B$ and the code $x_Y^A(t)=x_Y^B(t)$.

As before, controller 23 finds the delay δ that provides the peak value of S, and compares it to other values in order to determine whether the signal send by unit 203 contains a bona fide signal from that particular satellite for which the processing operation of equation (46) was just executed.

Needless to say, Approaches A and B, described above, are simply two preferred implementations and many variations exist. For example, unit 201 could send C/A code information as well as Y code information. In this case, unit 301 could determine the relative timing, $\delta=\tau^B-\tau^A$, for the C/A code as well as the Y code and insist that they agree. Other variations exist. Under Approach A, unit 201 performs code and carrier wipeoff and unit 301 coherently demodulates the data. Under Approach B, unit 201 does not perform code or carrier wipeoff. Rather, it sends, more primitive, downshifted data, and unit 301 performs non-coherent demodulation. This pairing is mutable. In other words, unit 201 could send downshifted data and unit 301 could perform coherent demodulation.

The software with which one might wish to implement a particular embodiment of the invention disclosed herein is fairly simple to implement; though, of course, it takes time to create, as all software does. Notwithstanding the fact that the software needed to implement the invention disclosed herein is totally straight forward and can be easily implemented without undue experimentation by any person skilled in the art, to assist the reader, an appendix is included herein of an actual embodiment.

The above illustrative embodiment has the first receiver in a portable computer and the second receiver in gateway that is remote from the portable computer. Perhaps it should be mentioned explicitly that the assumption is that the signal received by receiver 301 is not impacted by a bogus signal to which the portable computer may be subjected. A mere physical separation, when it is big enough so that the receivers are not subjected to the signal of a given (bogus) source, tends to insure this situation because a hostile party is not likely to be able to send a bogus signal to portable 200 and to also send an appropriate replica of the same bogus signal to receiver 301. Additionally, receiver 301 can take steps to insure that this does not happen by, for example, using antennas that are electronically directed to respond well to signals only from certain directions (where the satellites are expected to be) and to not respond well to signals from other directions.

The above illustrative embodiment focuses on the processing being done in gateway 300. This makes sense for the illustrative embodiment, but it should be realized that other embodiments are certainly possible where it may be desirable to perform the processing in a moving unit that contains the receiver that outputs signal A and which potentially is under electronic attack (e.g., an airplane), for example, where the action in response to the authentication takes place in moving unit and/or when there are so many moving units that processing in the unit that generates signal B might overload the capability of the processor that is available at that location.

It should also be noted that the receiver that generates signal B does not need to be stationary because, as indicated above, mutual authentication is possible if the distance between the two receivers is big enough so that the receivers are not subjected to the signal of a given (bogus) source.

Figure 8:
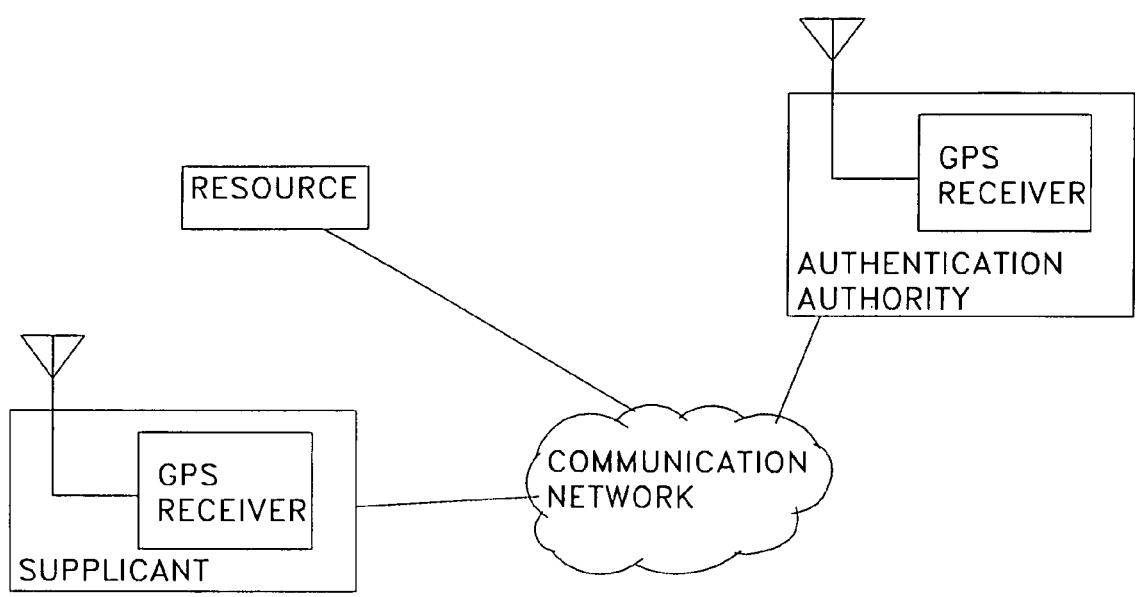
FIG. 8 presents an illustrative example of a three party embodiment of this invention, involving a supplicant, a resource, and an authentication authority.

The above illustrative embodiment is a two party example (portable 200 and gateway 300). FIG. 8 presents an illustrative example of a three party embodiment, involving a supplicant (e.g., portable 200), a resource (e.g., gateway 300) and an authentication authority. Signal A is provided by the supplicant, signal B is provided by the authentication authority and the processing is performed in any of the three locations, depending on the particular application and the desires of the parties. It may be noted that just as there is a memory in unit 201 of FIG. 4 for storing time segments of data, unit 301 can also include a memory for storing raw or processed data; particularly for applications where the at least some of the authentication processing is perform in other than the authentication authority.

One advantage of the FIG. 8 embodiment is that it efficiently supports many supplicant-resource pairs because it requires no GPS receiving or sophisticated processing by the resource, and because the authentication authority can afford to make greater efforts to insure that its signal B is authentic. For example, the supplicants can be bank customers, and the resources can be banks. High powered satellite antennas that are highly directional are expensive, and banks generally would be happy to not have to invest in such antennas but allow an authentication authority to guarantee that signal B is authentic. The authentication authority, on the other hand, can afford to employ expensive antenna arrangements and other techniques to insure the bona fide of signal B because the cost may be amortized over many customers of the authentication authority.

In addition (or in lieu of) using very directional antennas, the authentication authority can be located at some physically remote location that is secure from transmission by hostile parties. The remoteness makes it more likely than not that a hostile party will not succeed in transmitting to the directional antennas, and it will almost certainly ensure that whatever hostile signal is transmitted to units 201 will not correspond to the hostile signals to which the authentication authority might be subjected. By contrast, banks are situated in locations that are readily accessible to all.

Further, the authentication authority can be located permanently at its secure location and can make the effort to know its own global position with great accuracy, in contrast to banks that sometimes change locations. This allows the authentication authority to compute its location from the received signals and by comparing the computed location with the known location it can confirm that its received signals are bona fide. Moreover, since the authentication of a location is effectively decided by comparing an asserted location to a location computed relative to the location of the authentication authority, an accurate location of the authentication authority is important.

Further still, the authentication authority can itself receive other signals that it can process to confirm the bona fide of its signal B—for example, from locations that are greatly removed from the authentication authority location that receives signal B, or from other systems (e.g., LORAN).

In yet another improvement, the authentication authority has a number of facilities, at different locations around the globe, and the signal 13 that is used for processing is from a location that is selected truly randomly (in contrast to pseudorandomly) from among the different locations.

It should be noted that in the above example of bank customers, banks, and an authentication authority, the banks may be satisfied to direct customers to send signal A to the authentication authority and have the authentication authority provide the bank (via a securely transmitted message) the location of the supplicant customer and a confirmation that the location is authentic. Presumably, this would allow the bank to proceed with the transaction in which the bank customer wishes to engage. On the other hand, the bank may wish to merely receive signal B from the authentication authority and itself accept signal A from its customers and itself do the processing. In the first case, the processing is done at the authentication authority, while in the second case the processing is done at the resource.

Thus useful embodiments exist where the processing is performed in the supplicant's equipment, in the resource's equipment, or in the authentication authority equipment.

By way of example and not by way of limitation, the following illustrates a number of applications, in addition to the applications described above, to which the principles disclosed herein are applicable.

Information & Asset Protection: Determine location of a device, such as portable computer 201, and allow operation of that device or access to sensitive information on the device only if the device is at an authorized location or within an authorized zone.

Financial Transaction assurance: Verify that the person (or agent) at the other end of a communication channel is really who the person claims to be, by verifying that the communication originates from a known, authorized, and secure location.

Fraud Detection & Non-repudiation: Check whether a transaction originated from where it claims to have originated, and thereby acquire a confirmation that a document to which an electronic signature is affixed (or other means of verifying a transaction/communication) really did originate from where the message claims to have originated.

Asset Tracking & Route Auditing: Confirm where an object is and/or recreate the route that the object followed during a chosen time span (e.g., while being transported)—by recording signal segments and later processing the signal segments.

Internet & Online Security: Confirm that a party that provides information or seeks information (e.g., a web server) is located at a particular spot, which location presumably can be checked against online public databases or printed (and presumably secure/unmodified) versions of databases.

Secure Electronic communication: Use location to verify identity and to increase security of cryptographic key exchange between two or more parties. This includes distribution of encryption/decryption keys (either symmetric or asymmetric), where only a supplicant with the correct geo-location can obtain the cryptographic key; or even more securely, where the key is never communicated directly, even in encrypted form, and only a supplicant with the correct geo-location can determine the cryptographic key.

Smartcards & Access Control: Confirm location during an access-request transaction with a centralized access-granting authority.

The invention claimed is:
1. A method comprising the steps of:
receiving via a first receiver a first signal that is composed of a plurality of signals

$$S_{received}^A = \sum_{i=1}^{j} \left\{ \begin{array}{l} A_i^A D_i^A(t-\tau_i)x_{i,C}(t-\tau_i)\cos(2\pi(f_{i,L1}+f_{i,D}^A)t+\varphi_i^A) + \\ B_i^A D_i^A(t-\tau_i)x_{i,Y}(t-\tau_i)\sin(2\pi(f_{i,L1}+f_{i,D}^A)t+\varphi_i^A) \end{array} \right\}$$

where $A_i$ and $B_i$ are amplitude constants pertaining to signal from satellite i, $D_i(t)$ is data signal from satellite i, superscript A designating signals of said first receiver, $\tau_i$ is transit delay from satellite i to said first receiver, $x_{i,C}(t)$ is a first code signal from satellite i, $x_{i,Y}(t)$ is a second code from satellite i, which is at least nearly orthogonal to the first code, $\cos(2\pi(f_{i,L1}+f_{i,D})t+\phi_i)$ is a carrier signal from satellite i of frequency $f_{i,L1}$ that experiences a Doppler shift of $f_{i,D}$ during transit from the satellite to the first receiver, and arrives at the first receiver with a phase shift of $\phi_i$, and $\sin(2\pi(f_{i,L1}+f_{i,D})t+\phi_i)$ is a signal that is orthogonal to the $\cos(2\pi(f_{i,L1}+f_{i,D})t+\phi_i)$ carrier signal; where $x_{i,C}(t)$ is publicly known, and $x_{i,Y}(t)$ is adapted to be publicly unknown;

receiving via a second receiver a second signal that is composed of a plurality of signals $$S_{received}^B = \sum_{i=1}^{j} \left\{ \begin{array}{l} A_i^B D_i^B(t-\tau_i)x_{i,C}(t-\tau_i)\cos(2\pi(f_{i,L1}+f_{i,D}^B)t+\varphi_i^B) + \\ B_i^B D_i^B(t-\tau_i)x_{i,Y}(t-\tau_i)\sin(2\pi(f_{i,L1}+f_{i,D}^B)t+\varphi_i^B) \end{array} \right\}$$

signal that contains a second unknown signal which communicates information that is different from, but related to, the information communicated by the first unknown signal, superscript B designating signals of said second receiver; and processing the first signal and the second signal to authenticate an assertion that at least a subset of said plurality of signals of which signal $S_{received}^B$ is comprised originates from the same sources from which a corresponding subset of signals of which signal is comprised originates.

2. The method of claim 1 where said processing, for each $1 \leq j \leq j$, develops signals $$S_{i,Q}^B(t)=A_i^B D_i^B(t-\tau_i^B)x_{i,C}^B(t-\hat{\tau}_i^B)\sin(2\pi(f_{i,D}^B-\hat{f}_{i,D}^B)t+\theta_{i,1}^B-\hat{\theta}_{i,1}^B)-B_i^B D_i^B(t-\tau_i^B)x_{i,Y}^B(t-\hat{\tau}_i^B)\cos(2\pi(f_{i,D}^B-\hat{f}_{i,D}^B)t+\theta_{i,1}^B-\hat{\theta}_{i,1}^B)$$

from signal $S_{received}^B$, where $\hat{f}_{i,D}^B$ is an accurate estimate of $f_{i,D}^B$ and $\hat{\theta}_{i,1}^B$ is an estimate of $\theta_{i,1}^B$, and signals $$S_{i,Q}^A(t)=A_i^A D_i^A(t-\tau_i^A)x_{i,C}^A(t-\hat{\tau}_i^A)\sin(2\pi(f_{i,D}^A-\hat{f}_{i,D}^A)t+\theta_{i,1}^A-\hat{\theta}_{i,1}^A)-B_i^A D_i^A(t-\tau_i^A)x_{i,Y}^A(t-\hat{\tau}_i^A)\cos(2\pi(f_{i,D}^A-\hat{f}_{i,D}^A)t+\theta_{i,1}^A-\hat{\theta}_{i,1}^A)$$

from signal $S_{received}^A$, where $\hat{f}_{i,D}^A$ is an accurate estimate of $f_{i,D}^A$ and $\hat{\theta}_{i,1}^A$ is an estimate of $\theta_{i,1}^A$;

correlating $S_{i,Q}^\beta(t)$ with $S_{i,Q}^\alpha(t-\delta_i)$ where $\alpha$=A and $\beta$=B, or $\alpha$=B and $\beta$=A; and identifying $\delta_i$ that provides a maximum correlation value.

3. The method of claim 2 where said processing further comprises determining global position of point of reception of said first signal from said values $\delta_i$, relative to point of reception of said second signal.

4. The method of claim 1 where said processing develops signals $$S_{i,I}{}^B(t)=A_i{}^B D_i{}^B(t-\tau_i{}^B)x_{i,C}{}^B(t-\hat{\tau}_i{}^B)\sin(2\pi(f_{i,D}{}^B-\hat{f}_{i,D}{}^B)t+\theta_{i,1}{}^B-\hat{\theta}_{i,1}{}^B)-B_i{}^B D_i{}^B(t-\tau_i{}^B)x_{i,Y}{}^B(t-\hat{\tau}_i{}^B)\cos(2\pi(f_{i,D}{}^B-\hat{f}_{i,D}{}^B)t+\theta_{i,1}{}^B-\hat{\theta}_{i,1}{}^B)$$

from signal $S_{received}{}^B$, where $\hat{f}_{i,D}{}^B$ is an accurate estimate of $f_{i,D}{}^B$ and $\hat{\theta}_{i,1}{}^B$ is an estimate of $\theta_{i,1}{}^B$, and signals $S_{i,I}{}^A(t)=W_i+X_i$ and $S_{i,Q}{}^A(t)=Y_i-Z_i$ from signal $S_{received}{}^A$, where $$W_i=A_i{}^A D_i{}^A(t-\tau_i{}^A)x_{i,C}{}^A(t-\tau_i{}^A)\cos(2\pi(f_{i,D}{}^A-\hat{f}_{i,D}{}^A)t+\theta_{i,1}{}^A)$$

$$X_i=B_i{}^A D_i{}^A(t-\tau_i{}^A)x_{i,Y}{}^A(t-\tau_i{}^A)\sin(2\pi(f_{i,D}{}^A-\hat{f}_{i,D}{}^A)t+\theta_{i,1}{}^A)$$

$$Y_i=A_i{}^A D_i{}^A(t-\tau_i{}^A)x_{i,C}{}^A(t-\tau_i{}^A)\sin(2\pi(f_{i,D}{}^A-\hat{f}_{i,D}{}^A)t+\theta_{i,1}{}^A)$$

and $$Z_i=B_i{}^A D_i{}^A(t-\tau_i{}^A)x_{i,Y}{}^A(t-\tau_i{}^A)\cos(2\pi(f_{i,D}{}^A-\hat{f}_{i,D}{}^A)t+\theta_{i,1}{}^A),$$

and where $\hat{f}_{i,D}{}^A$ is an estimate of $f_{i,D}{}^A$; and
identifying delays, $\delta_i$ that maximize respective signals $$S_i=\sqrt{(\int S_{i,Q}{}^\beta(t)S_{i,Q}{}^\alpha(t-\delta))^2+(\int S_{i,Q}{}^\beta(t)S_{i,Q}{}^\alpha(t-\delta))^2}$$

where $\alpha=A$ and $\beta=B$, or $\alpha=B$ and $\beta=A$.

5. The method of claim 4 where said processing further comprises determining global position of point of reception of said first signal from said values $\delta_i$, relative to point of reception of said second signal.

6. The method of claim 1 where said processing develops signals $$S_{i,I}{}^B(t)=A_i{}^B D_i{}^B(t-\tau_i{}^B)x_{i,C}{}^B(t-\hat{\tau}_i{}^B)\cos(2\pi(f_{i,D}{}^B-\hat{f}_{i,D}{}^B)t+\theta_{i,1}{}^B-\hat{\theta}_{i,1}{}^B)+B_i{}^B D_i{}^B(t-\tau_i{}^B)x_{i,Y}{}^B(t-\hat{\tau}_i{}^B)\sin(2\pi(f_{i,D}{}^B-\hat{f}_{i,D}{}^B)t+\theta_{i,1}{}^B-\hat{\theta}_{i,1}{}^B)$$

and $$S_{i,Q}{}^B(t)=A_i{}^B D_i{}^B(t-\tau_i{}^B)x_{i,C}{}^B(t-\hat{\tau}_i{}^B)\sin(2\pi(f_{i,D}{}^B-\hat{f}_{i,D}{}^B)t+\theta_{i,1}{}^B-\hat{\theta}_{i,1}{}^B)-B_i{}^B D_i{}^B(t-\tau_i{}^B)x_{i,Y}{}^B(t-\hat{\tau}_i{}^B)\cos(2\pi(f_{i,D}{}^B-\hat{f}_{i,D}{}^B)t+\theta_{i,1}{}^B-\hat{\theta}_{i,1}{}^B)$$

from signal $S_{received}{}^B$, where $\hat{f}_{i,D}{}^B$ is an accurate estimate of $f_{i,D}{}^B$ and $\hat{\theta}_{i,1}{}^B$ is an estimate of $\theta_{i,1}{}^B$, and signals $$S_{i,I}{}^A(t)=A_i{}^A D_i{}^A(t-\tau_i{}^A)x_{i,C}{}^A(t-\hat{\tau}_i{}^A)\cos(2\pi(f_{i,D}{}^A-\hat{f}_{i,D}{}^A)t+\theta_{i,1}{}^A-\hat{\theta}_{i,1}{}^A)+B_i{}^A D_i{}^A(t-\tau_i{}^A)x_{i,Y}{}^A(t-\hat{\tau}_i{}^A)\sin(2\pi(f_{i,D}{}^A-\hat{f}_{i,D}{}^A)t+\theta_{i,1}{}^A-\hat{\theta}_{i,1}{}^A)$$

and $$S_{i,Q}{}^A(t)=A_i{}^A D_i{}^A(t-\tau_i{}^A)x_{i,C}{}^A(t-\hat{\tau}_i{}^A)\sin(2\pi(f_{i,D}{}^A-\hat{f}_{i,D}{}^A)t+\theta_{i,1}{}^A-\hat{\theta}_{i,1}{}^A)-B_i{}^A D_i{}^A(t-\tau_i{}^A)x_{i,Y}{}^A(t-\hat{\tau}_i{}^A)\cos(2\pi(f_{i,D}{}^A-\hat{f}_{i,D}{}^A)t+\theta_{i,1}{}^A-\hat{\theta}_{i,1}{}^A)$$

from signal $S_{received}{}^A$, where $\hat{f}_{i,D}{}^A$ is an accurate estimate of $f_{i,D}{}^A$ and $\hat{\theta}_{i,1}{}^A$ is an estimate of $\theta_{i,1}{}^A$;
 a. correlating $S_{i,I}{}^\beta(t)$ with $S_{i,I}{}^\alpha(t-\delta_i)$ where $\alpha=A$ and $\beta=B$, or $\alpha=B$ and $\beta=A$;
 b. correlating $S_{i,Q}{}^\beta(t)$ with $S_{i,Q}{}^\alpha(t-\delta_i)$ where $\alpha=A$ and $\beta=B$, or $\alpha=B$ and $\beta=A$;
 identifying the $\delta_i$ that provides a maximum correlation value for (a);
 identifying the $\delta_i$ that provides a maximum correlation value for (b); and
 confirming that the $\delta_i$ that provides a maximum correlation value for correlation operation (a) also provides a maximum correlation value for correlation operation (b).

7. The method of claim 6 where said processing further comprises determining global position of point of reception of said first signal from said values $\delta_i$, relative to point of reception of said second signal.

8. The method of claim 1 where said processing develops signals $$S_{i,I}{}^B(t)=A_i{}^B D_i{}^B(t-\tau_i{}^B)x_{i,C}{}^B(t-\hat{\tau}_i{}^B)\cos(2\pi(f_{i,D}{}^B-\hat{f}_{i,D}{}^B)t+\theta_{i,1}{}^B-\hat{\theta}_{i,1}{}^B)+B_i{}^B D_i{}^B(t-\tau_i{}^B)x_{i,Y}{}^B(t-\hat{\tau}_i{}^B)\sin(2\pi(f_{i,D}{}^B-\hat{f}_{i,D}{}^B)t+\theta_{i,1}{}^B-\hat{\theta}_{i,1}{}^B)$$

and $$S_{i,Q}{}^B(t)=A_i{}^B D_i{}^B(t-\tau_i{}^B)x_{i,C}{}^B(t-\hat{\tau}_i{}^B)\sin(2\pi(f_{i,D}{}^B-\hat{f}_{i,D}{}^B)t+\theta_{i,1}{}^B-\hat{\theta}_{i,1}{}^B)-B_i{}^B D_i{}^B(t-\tau_i{}^B)x_{i,Y}{}^B(t-\hat{\tau}_i{}^B)\cos(2\pi(f_{i,D}{}^B-\hat{f}_{i,D}{}^B)t+\theta_{i,1}{}^B-\hat{\theta}_{i,1}{}^B)$$

from signal $S_{received}{}^B$, where $\hat{f}_{i,D}{}^B$ is an accurate estimate of $f_{i,D}{}^B$ and $\hat{\theta}_{i,1}{}^B$ is an estimate of $\theta_{i,1}{}^B$, and signals $S_{i,I}{}^A(t)=W_i+X_i$ and $S_{i,Q}{}^A(t)=Y_i-Z_i$ from signal $S_{received}{}^A$, where $$W_i=A_i{}^A D_i{}^A(t-\tau_i{}^A)x_{i,C}{}^A(t-\tau_i{}^A)\cos(2\pi(f_{i,D}{}^A-\hat{f}_{i,D}{}^A)t+\theta_{i,1}{}^A)$$

$$X_i=B_i{}^A D_i{}^A(t-\tau_i{}^A)x_{i,Y}{}^A(t-\tau_i{}^A)\sin(2\pi(f_{i,D}{}^A-\hat{f}_{i,D}{}^A)t+\theta_{i,1}{}^A)$$

$$Y_i=A_i{}^A D_i{}^A(t-\tau_i{}^A)x_{i,C}{}^A(t-\tau_i{}^A)\sin(2\pi(f_{i,D}{}^A-\hat{f}_{i,D}{}^A)t+\theta_{i,1}{}^A)$$

and
$$Z_i=B_i{}^A D_i{}^A(t-\tau_i{}^A)x_{i,Y}{}^A(t-\tau_i{}^A)\cos(2\pi(f_{i,D}{}^A-\hat{f}_{i,D}{}^A)t+\theta_{i,1}{}^A),$$

and where $\hat{f}_{i,D}{}^A$ is an estimate of $f_{i,D}{}^A$;
 a. identifying delay $\delta_i$ that maximizes respective signals $$S_i=\sqrt{(\int S_{i,I}{}^\beta(t)S_{i,Q}{}^\alpha(t-\delta))^2+(\int S_{i,I}{}^\beta(t)S_{i,I}{}^\alpha(t-\delta))^2}$$

where $\alpha=A$ and $\beta=B$, or $\alpha=B$ and $\beta=A$;
 b. identifying delay $\delta_i$ that maximizes respective signals $$S_i=\sqrt{(\int S_{i,Q}{}^\beta(t)S_{i,Q}{}^\alpha(t-\delta))^2+(\int S_{i,Q}{}^\beta(t)S_{i,I}{}^\alpha(t-\delta))^2}$$

where $\alpha=A$ and $\beta=B$, or $\alpha=B$ and $\beta=A$; and
 confirming that the $\delta_i$ that provides a maximum correlation value for correlation operation (a) also provides a maximum correlation value for correlation operation (b).

9. The method of claim 8 where said processing further comprises determining global position of point of reception of said first signal from said values $\delta_i$, relative to point of reception of said second signal.

* * * * *